United States Patent [19]
Bunnell et al.

[11] Patent Number: 5,594,903
[45] Date of Patent: Jan. 14, 1997

[54] OPERATING SYSTEM ARCHITECTURE WITH RESERVED MEMORY SPACE RESIDENT PROGRAM CODE IDENTIFIED IN FILE SYSTEM NAME SPACE

[75] Inventors: Mitchell Bunnell, Los Gatos; Deepinder Setia, San Jose, both of Calif.

[73] Assignee: Lynx Real-Time Systems, Inc., San Jose, Calif.

[21] Appl. No.: 163,593

[22] Filed: Dec. 7, 1993

Related U.S. Application Data

[63] Continuation of Ser. No. 42,470, Apr. 5, 1993, abandoned, which is a continuation of Ser. No. 661,472, Feb. 26, 1991, abandoned.

[51] Int. Cl.⁶ .................................................. G06F 9/445
[52] U.S. Cl. ........................ 395/712; 395/652; 395/682; 395/685
[58] Field of Search .................................. 395/700, 800, 395/650

[56] References Cited

U.S. PATENT DOCUMENTS

| | | | |
|---|---|---|---|
| 4,218,757 | 8/1980 | Drogichen | 364/900 |
| 4,558,176 | 12/1985 | Arnold et al. | 178/22.08 |
| 4,607,332 | 8/1986 | Goldberg | 364/200 |
| 4,626,986 | 12/1986 | Mori | 364/200 |
| 4,720,812 | 1/1988 | Kao et al. | 364/900 |
| 4,868,822 | 9/1989 | Scott et al. | 371/16 |
| 4,947,477 | 8/1990 | Little | 364/200 |
| 4,993,027 | 2/1991 | McGraw et al. | 371/16.2 |
| 5,109,521 | 4/1992 | Culley | 395/800 |
| 5,136,590 | 8/1992 | Polstra et al. | 371/16.2 |

OTHER PUBLICATIONS

Robert Jourdain, "Programmer's Problem Solver for the IBM PC, XT & AT" 1986, pp. 1–16 and 451–467.
Liu, "Microcomputer Systems: The 8086/8088 Family", Prentice–Hall, 1986, pp. 26–39 and 155–160.
Mathews, "Assembly Language Primer for the Macintosh", The Waite Group, 1985, pp. 39–100.

*Primary Examiner*—Kevin A. Kriess
*Assistant Examiner*—Dennis M. Butler
*Attorney, Agent, or Firm*—Fliesler, Dubb, Meyer & Lovejoy

[57] ABSTRACT

A computer architecture having a main memory suitable for the storage of programs and data accessible within a predefined memory address space, a central processor capable of accessing the memory address space and a modified disk operating system program capable of execution from ROM or in a diskless environment. The operating system, upon execution by the processor, provides for the reservation of a first portion of the memory address space for support and application programs, preferably in a disk paradigm, a second portion for dynamic allocation and recovery by the operating system as necessary for the execution of support and application programs, and a third portion, located within said second portion, for the static storage, at predefined addresses, of the executable code segments of the support and application programs. Each support and application program includes an address reference to its corresponding executable code segment, in the third portion of the memory address space.

16 Claims, 6 Drawing Sheets

OPERATING SYSTEM ARCHITECTURE WITH RESERVED MEMORY SPACE RESIDENT PROGRAM CODE IDENTIFIED IN FILE SYSTEM NAME SPACE

This application is a continuation of Ser. No. 08/042,470, filed Apr. 5, 1993, now abandoned, which is a continuation of Ser. No. 07/661,472, filed Feb. 26, 1991, now abandoned.

BACKGROUND OF THE INVENTION

1. Field of the Invention

The present invention is generally related to operating systems for general purpose computers and, in particular, an operating system architecture that optimally permits execution from ROM and in diskless environments with application program code provided in a reserved portion of main memory, though identified in file system name space.

2. Description of the Related Art

The complexity of applications and the intended operating environments that are addressed by present day computer systems has grown increasingly sophisticated and diverse. Accordingly, the sophistication and complexity of the operating systems needed to control computer systems has also increased. Areas of particularly increased complexity include embedded controller and distributed execution computer architectures.

Embedded controllers are often utilized to control dedicated hardware in applications such as machine control, robotics, process control, avionics, and instrumentation. In order to meet the control requirements of such applications, the embedded controller must be able to receive and process input data, correlate the processed data with defined control state transitions, and process and output control data as appropriate to respond to the input data, often all in real time. Where the complexity of a control process is substantial, multiple applications may be implemented to direct, monitor, analyze, and report corresponding aspects of the control process. Thus, the operating system must desirably provide not only for the multi-tasked execution of control applications, it must also provide for optimal interprocess communications between the applications. Depending on the actual operating environment and the needs and function of intercommunicating applications, any one of several interprocess communication software mechanisms may prove to be the optimal choice; a selection made independently by the application programs. Therefore, a rather sophisticated operating system is required to simultaneously support a variety of interprocess communication software mechanisms.

In order to ensure the robustness of specific, often dedicated application programs, as well as the operating system itself, the ideal design choice is to utilize a single software and hardware architecture for both the embedded controller and as a software development and testing platform for both application programs and the operating system. However, the actual operating environment of embedded controllers, for example, is usually substantially less than desirable for software development. Specifically, many embedded controller applications do not provide for or, due to hostile environmental conditions or cost considerations, allow for the use of a disk drive; a platform component generally considered essential for software development. Further, the resource requirements of an operating system suitable for software development, such as a minimum RAM main memory size, may reduce the long-term commercial practicality of a common hardware architecture embedded controller system.

In such situations, fully custom embedded controller application programs and operating systems are typically developed and tested in a "cross-development" environment. Such environments are highly desirable where the operating system and applications do not provide a disk drive paradigm. However, the software layer implemented to emulate the actual hardware environment of the embedded controller application programs and operating system will reduce the at least initial robustness of the development. In particular, testing of the application programs and operating system, given the uncertainties and impreciseness of the cross-development environment with respect to the actual hardware environment of the embedded controller, is considerably more difficult to perform and verify.

Alternatively, a design choice can be made to use application programs that rely on a disk drive paradigm. A conventional disk operating system can then be used. Typically, such implementations merely provide for a direct image of the operating system and application programs to be stored in ROM. The image is copied to RAM main memory on initialization of the embedded controller. The disk drive paradigm is suggested through the allocation of a RAM storage area configured as a pseudo-disk drive. Implementations of this type of design, again, have the limitation of requiring not only substantial ROM storage space, but also a much larger RAM main memory.

Distributed execution computer architectures are typically implemented as a node or workstation embodying a general purpose computer, a main memory and a communications port. A disk drive for local data storage is characteristically absent. Cost savings is a primary reason for not providing a disk drive. Other reasons include a designed-in dedicated reliance on a central or remote file server for all program and data files, an ability to centrally manage and maintain the application programs and operating system executed by the node, and enforced data integrity and security considerations. In any case, such diskless workstations must be typically capable of executing operating systems that are fully compatible with standard, commercial application programs. Consequently, provision must be made for the fact that such operating systems and their application programs typically incorporate if not essentially rely on a disk drive paradigm.

Another often desired feature for diskless workstations is to have some limited stand-alone operational capability. In a minimum form, this allows diagnostic programs to be run. However, a less essential, but more practical reason is to remove the requirement that the operating system and each instantiation of an application program be transferred through the communications port. Not only does this generally burden the communication channel, but it places specific requirements on the file server and introduces an often significant delay in the loading of the operating system and each instantiation of an application program. Consequently, it is desireable that at least a basic operating system and the most frequently used application programs be stored locally in ROM or tightly packaged for streamlined transfer via the communications channel. Again, however, a premium is evident on the optimal use of local ROM storage and RAM main memory.

SUMMARY OF THE INVENTION

Thus, a general purpose of the present invention is to provide an operating system architecture suitable for execution from ROM directly or down-loadable through a communications connection.

This is accomplished by the present invention by providing a computer architecture having a main memory suitable for the storage of programs and data accessible within a predefined memory address space, a central processor capable of accessing the memory address space and a modified disk operating system program capable of execution entirely from primary memory, such as ROM. The operating system, upon execution by the processor, provides for the reservation of a first portion of the memory address space for support and application programs, preferably in a disk paradigm, a second portion for dynamic allocation and recovery by the operating system as necessary for the execution of support and application programs, and a third portion, located within said second portion, for the static storage, at predefined addresses, of the executable code segments of the support and application programs. Each support and application program, at least as stored in the first portion, includes an address reference to its corresponding executable code segment in the third portion of the memory address space.

Thus, an advantage of the present invention is that it enables use of an optimally configured kernel for both embedded controller and diskless node applications.

Another advantage of the present invention is that it permits the kernel and substantial portions of application program to be executed directly from ROM, thereby allowing optimal and cost effective use of memory components used to implement main memory. Still another advantage of the present invention is that it permits designer selection of execution of a ROMable kernel and application programs from ROM or from static image copies transferred to reserved portions of RAM main memory.

A further advantage of the present invention is that it provides and maintains compatibility with standard disk operating system functions independent of ROM or diskless based environments. This allows for the flexible and standard incorporation of disk operating system features, device drivers, and support and application programs.

Another advantage of the present invention is that it preserves a maximum size of RAM main memory space for transient application programs by minimizing duplicate instantiations of program code segments. Execution delay due to repeated copying of program code segments is also generally eliminated.

Yet still another advantage of the present invention is that it requires only minimum, strategic changes to the disk operating system kernel boot loader, and application program loader to enable use of a ROMable disk operating system kernel in an embedded controller or diskless node environment and for execution of program code stripped application programs.

BRIEF DESCRIPTION OF THE DRAWINGS

These and other advantages and features of the present invention will become better understood upon consideration of the following detailed description of the invention when considered in connection of the accompanying drawings, in which like reference numerals designate like parts throughout the figures thereof, and wherein.

DETAILED DESCRIPTION OF THE INVENTION

Figures 1, 2:
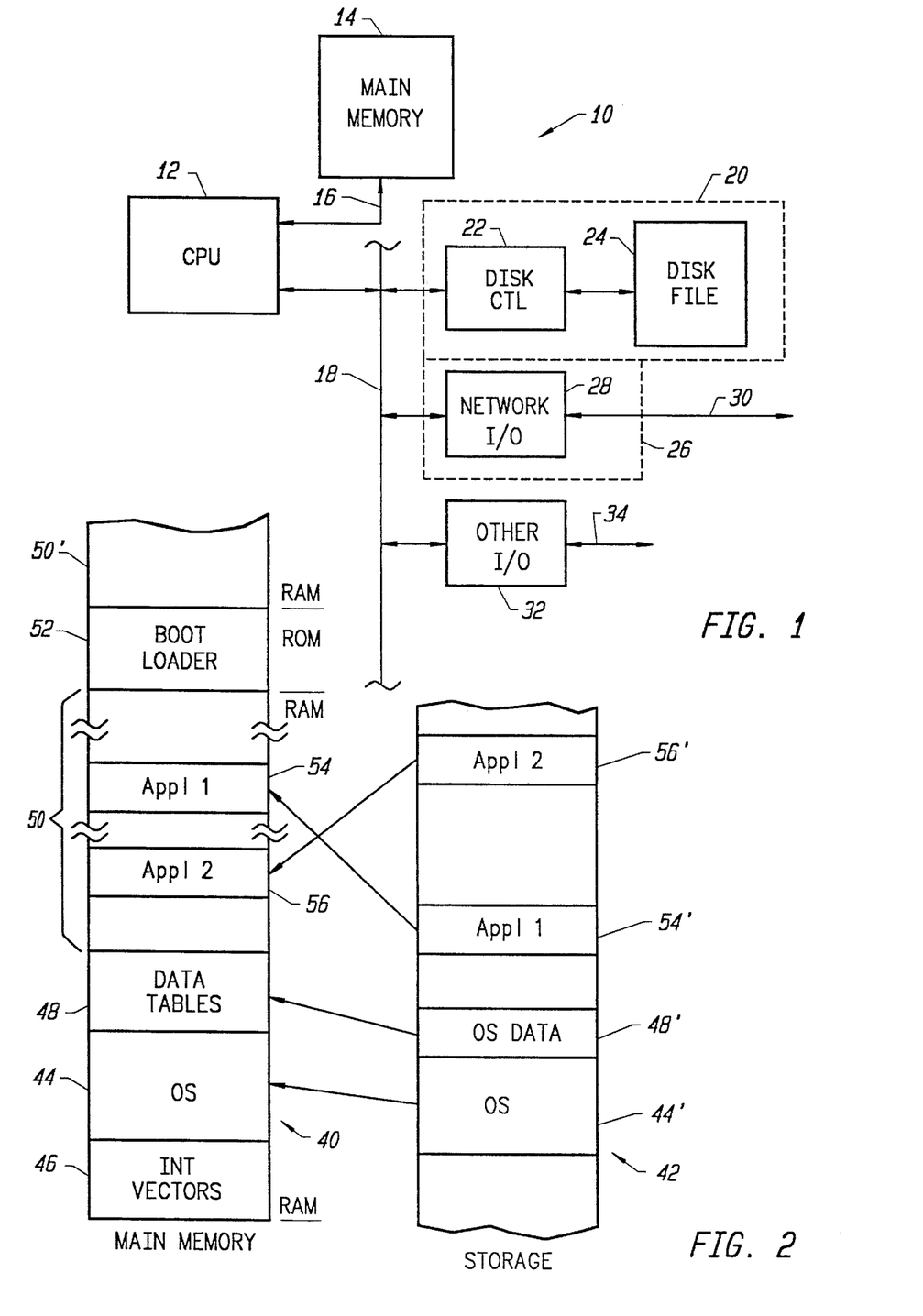
FIG. 1 is a simplified block diagram of a computer system suitable for use in conjunction with the present invention and that shows the optional architectural elements of a preferred embodiment of the present invention.
FIG. 2 illustrates a possible organization of main memory space and a storage facility in a conventional computer system.

A composite hardware architecture representing a number of alternate architectural embodiments of the present invention is generally indicated by the reference numeral 10 in FIG. 1. There, a central processing unit (CPU) 12 is coupled to a main memory array 14 via a memory bus 16. The CPU 12 may be any conventional processing element, though preferred embodiments of the present invention will typically use processors appropriate for embedded controllers, real time systems, graphics work stations and high speed communication nodes. Such processors may include, but are not limited to, Intel Corp. microprocessors i386, i486, i860, i960, i376, Motorola, Inc. microprocessors MC68030, MC68040, MC88000, the SPARC microprocessor of Sun Micro Systems, Inc. and the R3000, R4000 and R6000 microprocessors from MIPS Computer, Inc.

The main memory array 14 represents a virtual memory space potentially capable of referencing several terabytes. Within this address space an actual, or physical memory consisting of random access memory (RAM) and read only memory (ROM), may be suitably positioned to provide adequate storage for an operating system, operating system related data structures, and a transient application program execution area.

Operating systems, to which the present invention applies, include those that provide for the execution of typically multiple application programs. Such operating systems typically provide general application program system services and management functions necessary to permit simultaneous execution of multiple application programs. The system services may include, but are not limited to, dynamic memory allocation of a virtual address space for use by a process within a transient program area of the main memory array 14, and basic input/output operations. Management functions include, but are not limited to the loading and initialization of applications in preparation for execution, context switch management between multiple pending processes to permit the effective simultaneous execution of multiple application programs, and support of logical communication channels for data transfer between simultaneously executing applications. The Unix® operating system, a product of AT&T, Inc., and its many variants are exemplary operating systems suitable for use with the present invention. These operating systems share the same basic architectural features including logical presentation of a disk file paradigm, a file oriented logical reference to most significant operating system services, a broad array of multiprocess management and support functions including interprocess communications such as shared memory and semaphores, as well as compatibility with a wide range of standard application programs and software development tools. In particular, LynxOS™, an independently implemented UNIX compatible operating system, developed and available from Lynx Real-Time Systems, Inc., 16780 Lark Avenue, Los Gatos, Calif. 95030, is the preferred software system embodying the present invention. However, the present invention is applicable to a wide variety of other operating systems ranging from the MicroSoft, Inc. MS-DOS operating system to the VMS operating system provided by Digital Equipment Corporation, Inc.

In order to best appreciate the significant aspects of the present invention, it is first necessary to establish an understanding of the essential components of the computer and operating system architecture relevant to the present invention. An operating system boot loader program, or at least an initial boot stage portion thereof is provided within the addressable memory space of the CPU 12 at a default address intrinsically known by the CPU 12. This boot loader program must be sufficient, upon execution by the CPU 12, to control the loading, initialization and subsequent execution of further boot stages ending ultimately with execution of the operating system itself.

A typical boot loader program implements sufficient control capabilities for the CPU 12 to access a disk subsystem 20, including a disk controller 22 and disk file 24, from which to obtain an executable image of the operating system. The operating system, in turn, typically includes a more complete disk subsystem 20 control routine and a control routine for managing a network interface 26, including a network I/O controller 28 connected, for example, to an ethernet type local area network 30. Other input/output controllers 32, including terminal display controllers, data sensors and machine process control drivers, in addition to the disk subsystem 20 and network interface 26, are connected via a peripheral bus 18 to the CPU 12. In acceptable computer architectures 10, the memory and peripheral buses 16, 18 may be implemented as a single, generic bus.

In accordance with the preferred embodiments of the present invention, an image of the operating system is not obtained from the disk subsystem 20. Rather, the operating system image is either permanently resident in ROM memory provided within the address space of the main memory array 14 or transferred from the network interface 26 to RAM memory present within the memory array 14. In both cases, additional RAM memory is used for operating system data structures. In general, the remaining physical RAM memory is allocated for use as a transient program execution area. Transient programs, often generically referred to as application programs, include both non-operating system related application programs executed to realize an external function or purpose such as data logging or machine control, and daemon programs provided and executed to monitor, manage and, in some instances, implement particular aspects of the operating system itself including for example, virtual memory management and network communications protocol support functions.

A portion 40 of the addressable memory space within the main memory array 14 is shown in FIG. 2. This memory portion 40 is exemplary in nature as appropriate to illustrate the provision, but not necessarily the required physical position, of programs and data structures within the available physical memory space, in the RAM or ROM memory areas. However, as shown, the relative positioning and order of the data structures and programs is generally appropriate for Intel architecture microprocessor embodiments of the CPU 12. Other possible relative positioning of data structures and programs within the memory portion 40 will be readily apparent to those that are familiar with the preferred memory architectures of other embodiments of the CPU 12.

Within the memory portion 40, an executable image of the operating system (OS) 44 is provided. Typically provided in low physical memory address space, the OS 44 is adjacent an interrupt vector table 46 typically positioned at the lowest end of physical memory. Operating system related data tables 48, including for example virtual memory page address translation tables used in support of a virtual memory management function performed by the CPU 12, are provided as necessary for the dynamic execution support of the OS 44. In general, the remaining RAM memory, generally referenced by the reference numerals 50, 50' is utilized as the transient program execution area.

An operating system boot loader program 52, typically provided in ROM memory, is positioned within the memory portion 40 at a default address appropriate for the particular implementation of the CPU 12. Thus, on initial powering of the CPU 12, program execution will be initiated at the default address resulting in the launching of the OS 44. The initial stages of the boot loader often include power-on diagnostics and system configuration checks executed prior to the launch of the OS 44.

The boot loader program 52 loads the OS 44 from a storage medium 42. Where the storage medium 42 is ROM memory located within some portion of the addressable memory space of the main memory array 14, the stored OS image 44' need only be copied by the boot loader program 52 to an appropriate location within the memory portion 40. Typically, a predefined and preinitialized operating system image data structure 48' must also be copied to the memory portion 40 in anticipation of the initial execution of the OS 44. Allocation of a memory space for additional uninitialized OS data, having an initial predefined size, is typically made to complete preparation of the data table area 48. Once having externally initialized the OS 44, the boot loader program 52 transfers execution control over the CPU 12 to the predefined operating system execution entry point of the OS 44. Initialization routines internal to the OS 44 are then executed to complete the preparation of the OS 44 for the execution of application programs. These initialization routines provides for the establishment of the interrupt vector table 46. Another function performed is the preparation of virtual page tables stored within corresponding data structures in the data table area 48 of the memory portion 40. These page tables are utilized in the dynamic allocation, controlled accessing and recovery of memory pages within the transient program execution areas 50, 50'.

Once the page tables have been properly initialized, application programs, executed either to further support the functionality of the OS 44 or to perform other functions requested of the computer system 10, can then be loaded and executed. Within the OS 44, as is typical of most operating systems, there is a program loader routine that is responsible for loading a target application program, initialization of appropriate operating system data tables 48, initialization of the target application itself, and finally initiating the execution of the target application.

Again, where the storage medium 42 is ROM memory, a first application program 54 is copied from the storage medium 42 to a dynamically allocated page or logical sequence of pages of memory within the transient area 50, 50'. Additional initialization of data tables within the data table area 48 is required to define the execution context of the application 54 and to define memory access controls over the specific memory space pages allocated for use by the application.

Contemporary program compilation practice provides a number of separate segments of predefined function in the construction of an executable program. Program segments typically fall into one of two classes: code and data. Code segments, typically one per application program, contain the actual executable code of the application program. A data segment loaded simultaneous with the loading of a code segment permits image establishment of the predefined and preinitialized program data structures. Additional data segment pages and specialized data segments may be allocated as appropriate to provide for a program stack and data structures that are dynamically created and released by the execution of application program. The program data segment includes a ".data" segment, for all required predetermined and preinitialized data, and a ".bss" segment, providing an initial cleared data area. A symbol table segment is also allocated to hold program data reference symbols. While this symbol segment may be deleted from an executable application program, the operating system symbol table is required to be present.

Segmentation of programs allows dynamic code and data referencing control over application program execution by the OS 44. For example, any attempt by an application program to execute outside of the allocated code segment address space or an attempt to write data within that space will result in a memory protection fault. Any attempt to read or write data outside of the data segments will also result in a memory protection fault. Detection of these kinds of errors are the result of continual, typically hardware based referencing of the corresponding memory protection control data tables maintained by the operating system 44. The management of memory protection faults is defined by corresponding fault handling routines within the OS 44.

Figure 3:
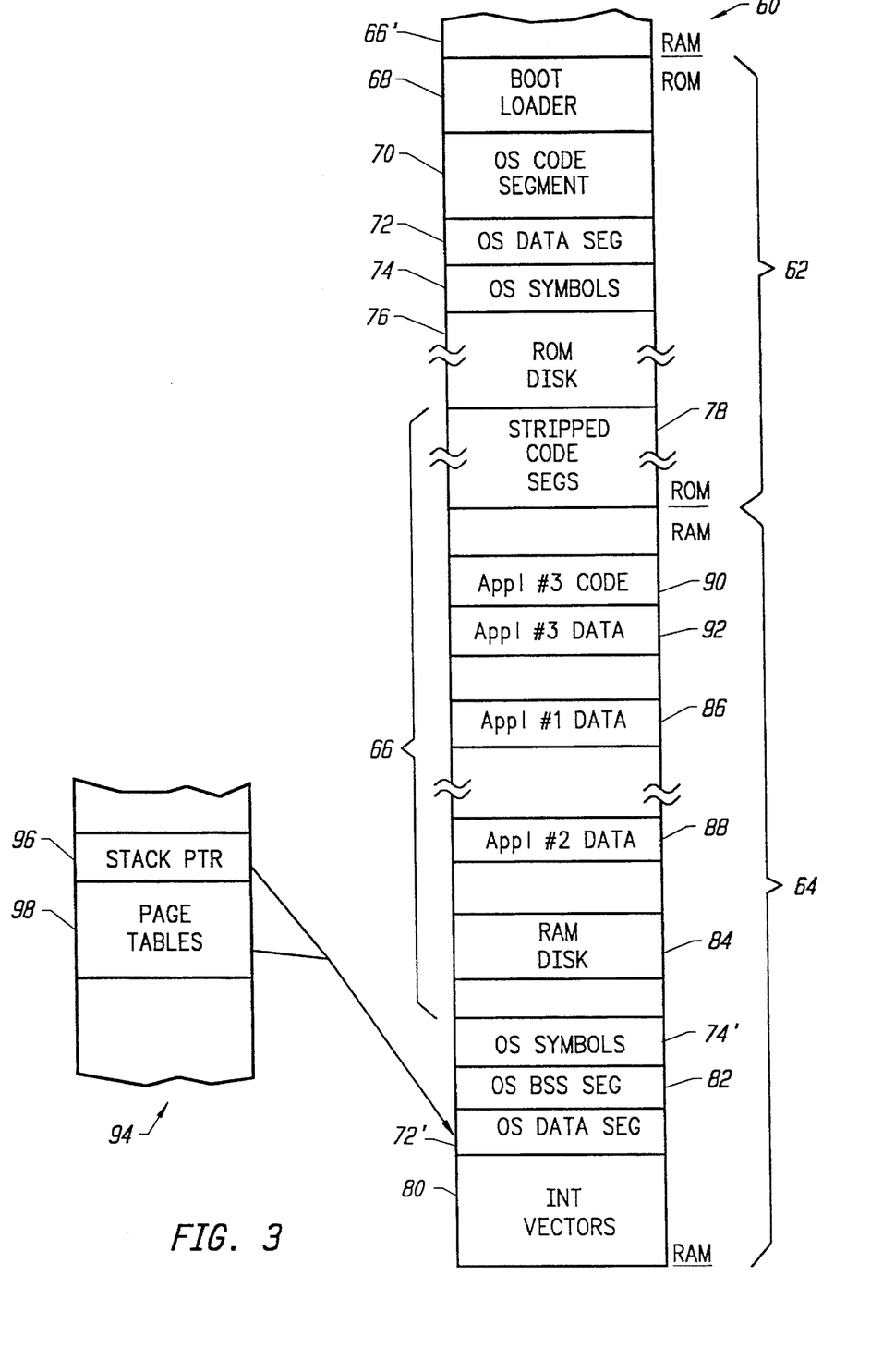
FIG. 3 illustrates a memory space map defined in accordance with a preferred embodiment of the present invention.

A representation of a virtual address space portion 60 of the main memory 14, configured in accordance with a preferred embodiment of the present invention, is shown is FIG. 3. This embodiment provides for active execution of the operating system and selected application program code segments directly from ROM stored code segment images. The address space portion 60 includes a nonvolatile portion 62, preferably implemented through any one or combination of ROM, EPROM, EEPROM and Flash EPROM storage devices. An alterable portion of memory 64 is preferably implemented through the use of RAM memory.

The nonvolatile portion 62 provides for the storage of the boot loader program 68 beginning at its predefined default address, an operating system including an OS code segment 70, an OS ".data" data segment 72, and a symbols segment 74, containing the logical reference elements used in accessing corresponding aspects of the OS data segment data structures. A 512 byte information block (not shown separately) is prepended to the operating system code segment 70 in the preferred embodiment of the present invention. This block provides for storage of certain initialization information. The operating system code segment 70 itself includes an initial program header stored aligned on a page boundary.

The operating system code segment 70 is preferably a ready to execute image of the operating system kernel including all necessary device drivers and operating system augmenting facilities. In particular, the augmenting facilities may include a TCP/IP protocol stack and a network file system (NFS) layer. The provision of such facilities, however, is optional depending on the intended execution environment. That is, the TCP/IP and NFS facilities are unnecessary if a network interface 26 is not present. If such facilities are included, then a corresponding device driver, specific to the network I/O controller 28 must also be included.

In accordance with the preferred embodiment of the present invention, a pseudo-disk driver must be present, configured and properly linked into the operating system code segment 70 code. This pseudo-disk driver is preferably capable of implementing a number of logical disk drives while actually using reserved portions of ROM and RAM memory within the address space 60. Other device drivers may be required to manage the operation of the other I/O control interface 32 and, if present, a disk drive subsystem 20.

The operating system kernel contained within the operating system code segment 70, typically by its nature as a disk operating system, provides a logical interface for controlling and transferring data with respect to physical disk drives. Any number of device drivers may be linked to the operating system kernel to provide a control and data channel between the logical kernel interface and the physical embodiment of the disk drive. Typically, disk oriented device drivers implement command and error control functions, as well as bufferred data transfer functions that are specific to a particular disk controller 22. A pseudo-disk device driver differs specifically in that it references a pre-allocated portion of the main memory address space portion 60 for the storage and retrieval of data. The structure and organization of data within this portion of memory is defined by the pseudo-disk device driver. Consequently, memory transfer requests directed to the logical interface corresponding to the pseudo-disk device driver results in a transfer of data fully within the main memory 14, though logically consistent with a disk drive paradigm.

Conventional disk operating systems also incorporate a concept of a file system for managing the organization of data on a disk drive. In the Unix operating system, for example, multiple file systems are provided in the default OS configuration. A base or "root" file system is required and any number of supplementary file systems are required or are optional depending on the specific implementation of the operating system. The root file system provides for the storage of at least the basic set of operating system programs and related data. The supplementary file systems are typically provided to store application programs and to receive data, either temporary or permanent, produced during the execution of the operating system and application programs.

Accordingly, a ROM disk 76 is provided to store a root file system for this preferred embodiment of the present invention.

Finally, a stripped code segments area 78 is provided in the nonvolatile portion 62 of the address space 60. This area 78 provides for the execution ready image storage of application program code segments.

In conventional computer systems, program and data images are stored in a disk file system in a format most suited for management of the file system and fast retrieval. When a conventional operating system receives a file access request, whether to execute a program or access data, the request is processed and directed to the logical disk drive interface of the operating system kernel. This, in turn, results in a disk reference to locate and then, for example, transfer the referenced program or data from disk to an assigned location within the transient program execution area.

However, where the size of transient program area is constrained, or where the access response time must be short, it is undesirable to have to duplicate instances of each program into the transient program area in order to permit execution. Thus, the present invention provides the ability to maintain the code segments of programs not in a file system format, but rather in the stripped code segments area 78 in a format that may be directly executed.

The storage of a program separately from the file system introduces a complexity in the implementation of a "compatible" operating system, i.e., where standard application programs must run substantially unaltered. Such standard application programs may make assumptions as to the location of other programs in the root file system. Where, as in Unix, the organization of the root file system is substantially predefined, and many assumptions are made as to the presence and location of programs, and even the structure of the file system itself. The operating system must therefore handle the circumstance where an application program provides a specific file system file location reference for a program. A rather fundamental change to the operating system would be required in order to identify and fully handle program references at any point prior to the kernel logical disk interface.

Alternately, modifications could be made in the pseudodisk device driver. However, such would be generally inappropriate. Normally, the operating system kernel is responsible for allocating main memory to receive a data transfer from logical disk interface and to logically associate the additional memory space with a particular process. A typical device driver, including specifically a disk-type device driver, is typically responsible for performing only the data transfer function, not managing the memory space that receives the data. Indeed, a substantial change to the kernel logical disk interface would be required in order to provide the necessary information to the device driver to perform such a logically separate management function.

The present invention achieves the goal of effectively integrating the programs stored in the stripped code segments area 78 into the root file system on the ROM disk 76 and allowing direct execution of the code segments by a strategic change to the operating system kernel and continued use of the unmodified kernel logical disk interface. Specifically the operating system program loader is modified to recognize, on initial access of a program apparently stored in a pseudo-disk file system, that the corresponding program segment is located in the stripped code segments area 78.

Figure 4A:
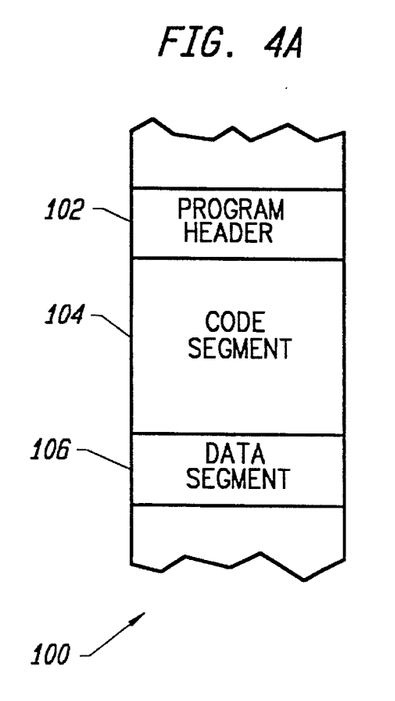
FIG. 4a illustrates the primary components of a standard application program as provided in a storage medium.

Referring now to FIG. 4a, a logical representation of an application program as stored by the ROM disk 76 or on a standard disk file 24. The program 100 includes a program header 102, a code segment 104, and data segment 106. The program header 102 generally contains information describing or qualifying the nature of the program 100. In particular, in Unix type operating systems, the program header 102 is constructed in a common object file format (COFF) or an "a.out" format. Table I describes both of these conventional structures of executable programs as stored in a file system. Specifically, the COFF program header consists of the number of data structures including a file header, a system header, and any number of section headers, though typically including three corresponding to the ".code", ".data" and ".bss" segments. The actual code segment then follows. The program data segment that in turn follows typically includes the pre-defined and pre-initialized data structure segment ".data" the uninitialized data segment ".bss" and a number of concluding data structures exemplified by the program symbol table.

TABLE I

| "COFF" Program Structure | | |
|---|---|---|
| Program Header | filehdr | # file header |
| | a.outhdr | # Unix system header |
| | scnhdr 1 | # code section header |
| | scnhdr 2 | # data section header |
| | scnhdr 3 | # bss section header |
| Program Code | .code | # code section storage |
| Program Data | .data | # initialized data section storage |
| | .bss | # uninitialized data section storage |
| | symbols | # symbol table data section storage |
| "a.out" Program Structure | | |
| Program Header | a_magic | # type of a.out file |
| | a_text | # .code segment size |
| | a_data | # .code segment size |
| | a_bas | # .code segment size |
| | a_syms | # .code segment size |
| | a_entry | # entry point |
| | a_trsize | # text relocation size |
| | a_drsize | # data relocation size |
| Program Code | .code | # code section storage |
| Program Data | .data | # initialized data section storage |
| | .bss | # uninitialized data section storage |
| | symbols | # symbol table data section storage |

Figure 4B:
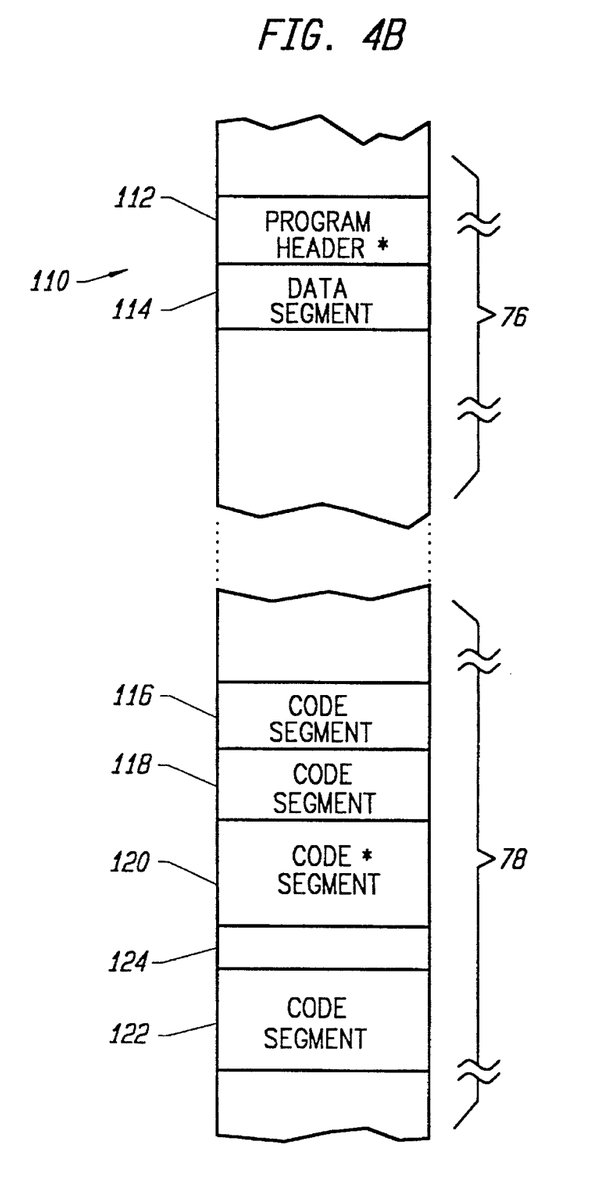
FIG. 4b illustrates a preferred program code stripped application program portion and the separate storage of the program code segment in a reserved portion of main memory.

However, as shown in FIG. 4b, the program structure preferred for application programs stored on the ROM disk 76, in accordance with the present invention, excludes the program code segment. Thus, an application program 110 as stored by the ROM disk 76 includes principally only a program header 112 and a data segment 114. Conventionally, an entire application program must be placed in RAM prior to execution. This results in a loss of main memory space equal to at least the size of the duplicated code segment. Moreover, a code segment must be effectively within the transient program area and aligned with a page boundary in order to permit execution. Page boundary alignment is a typical requirement of memory management and access protection control mechanisms. Typical page sizes range from 512 bytes to 16 kilobytes with an often preferred page size of four kilobytes. Location of application programs within a file system, such as the ROM disk 76 to meet the page alignment requirements alone, while possible, would not be optimal given the wide variety of file sizes and types.

Therefore, the code segments for the programs stored on the ROM disk 76, including the program 110, are separately stored in the stripped code segments area 78. Since, in the preferred embodiments, the page size for application programs within the transient program area 66 is fixed at 4 Kbytes, the code segments 116, 118, 120, 222 provided within stripped code segments area 78 are stored aligned with 4 Kbyte page boundaries. Where, for example, a code segment 120 does not end on a page aligned boundary, a gap 124 must be provided so that a subsequent code segment 122 is again aligned on a 4 Kbyte page boundary.

As can be seen from Table I, using a COFF structure program as an example, an application program is normally logically contiguous. That is, no provision is made in the structure of the program itself to identify where the component parts of the program are relative to one another. If there is any fragmentation of the program as stored by the file system, then the operating system must separately provide the ability to reconstruct the program. However, the present invention specifically provides for provision of the code segments 116, 118, 120, 122 logically separate from their corresponding program headers and, indeed, not even physically present in the file system.

Instead, the stripped code segments area 78 is a reserved area of main memory 14 consisting of code segments that can be logically included in the transient program area 66 upon execution of the corresponding application program. Thus, the code segments 116, 118, 120, 122 are executed directly at their addresses as stored within the nonvolatile memory area 62. The corresponding data segments must be located in RAM memory to allow execution. On execution of, for example, application program 110, the program header 112 provides the address of the corresponding code segment 120. An exemplary description of the COFF type file header, "a.out header" and section header as used in a preferred embodiment of the present invention is given in Table II.

TABLE II

Program Header Structure

```
struct filehdr {
    unsigned   short   f_magic;           /* file magic number */
    unsigned   short   f_nscns;           /* number of sections */
    long               f_timdat;          /* time & date stamp */
    long               f_symptr;          /* file ptr to symtab */
    long               f_nsyms;           /* no. symtab entries */
    unsigned   short   f_opthdr;          /* sizeof (opt hdr) */
    unsigned   short   f_flags;           /* flags */
}
struct a.outhdr {
    short              magic;             /* file magic number */
    short              vstamp;            /* number of sections */
    long               tsize;             /* time & date stamp */
    long               dsize;             /* file ptr to symtab */
    long               bsize;             /* no. symtab entries */
    short              entry;             /* sizeof (opt hdr) */
    short              text_start;        /* base virtual code
                                              addr */
    short              data_start;        /* base virtual
                                              data addr */
}
struct scnhdr {
    char               s_name[SYMMLEN];   /* section name */
    long               s_paddr;           /* physical address */
    long               s_vaddr;           /* virtual address */
    long               s_size;            /* section size */
    long               s_scnptr;          /* raw data ptr */
    long               s_relptr;          /* relocation ptr */
    long               s_lnnoptr;         /* line no.s ptr */
    unsigned   short   s_nreloc;          /* # reloc. entries */
    unsigned   short   s_nlnno;           /* # line no. entries */
    long               sflags;            /* flags */
}
```

The magic numbers, "f_magic" and "magic", are used by the operating system program loader to identify certain aspects of how the program is to be located in RAM memory for execution. The magic numbers are merely pre-defined constants that are defined by convention for Unix operating system application programs. A magic number of 0514, for example, indicates that the operating system program loader is to load the code segment, including the program header, in RAM memory beginning at a context specific virtual location of 0x00000000. Program data is located in the context specific virtual address space immediately following the end of the code segment. Typically, though specifically depending on the size of the program header, the actual ".code" segment will be located at a context specific virtual address of 0x000000A8.

In accordance with the preferred embodiments of the present invention, a new magic number of 0410 ("IMagic") is introduced to identify application programs, otherwise identifiable as a magic number 0514 type executable program, whose code segment has been stripped and located within the stripped code segments area 78. The actual physical address of the corresponding code segment is placed into the IMagic identified program header 112 to allow the operating system program loader to locate the corresponding code segment 120. In COFF style program headers, the code section header maintains a conventionally unused data field "s_paddr". Since, in the Unix operating system environment, application programs are executed within a virtual memory space, this physical address field, though defined, has had no identifiable use. Any physical address in a virtual address space is the same as the virtual address. Thus, only the s_vaddr address value is used.

However, the present invention advantageously utilizes this field for storing the physical address of the corresponding code segment. If, instead, an older style "a.out" program header format is used, the physical address of the code segment is inserted into the code stripped program structure immediately between the program header and data segment. Since an "a.out" program header includes a magic number field, the presence of the physical address is known and can be skipped in referencing the program data segment. In both cases, the operating system program loader is able to properly identify the corresponding code segment 120 and include it within the execution context of the application program 110.

Since code segments contain unmodifiable code only, the code segments 116, 118, 120, 122 may be readily executed from nonvolatile memory. Further, separate instantiations of the application program 110 may each include a particular code segment 120 within its execution context; separate images of the code segment 120 are not required.

Referring again to FIG. 3, the alterable portion 64 of memory is initialized, in the preferred embodiments of the present invention, to include the initial interrupt vector table 80, a copy of the OS data segment 72' transferred from the nonvolatile memory 62, an uninitialized OS ".bss" segment 82, and an image of the operating system symbols 74'. The OS ".data" segment 72' and OS .bss segment 82, in general, provide for storage of operating system data tables 94, including a stack pointer 96 and the page tables 98 utilized in the management of their virtual memory address space.

For compatibility purposes, where application programs need to create data files, a RAM disk 84 may be allocated within the transient program area 66. For example, the RAM disk 84 may be initialized to incorporate several file systems including a temporary file system mounted as "/tmp" on the root file system formed in the ROM disk 76. Many application programs assume that this directory exists and is available for the writing of scratch files. The RAM disk "/tmp" directory thus realized is writable although the root file system itself is not. Other file systems may be configured and mounted as appropriate to the needs of the specific application programs to be executed. The RAM disk 84 may also provide for the storage of application programs transferred to the computer system 10 via, for example, a detachable disk sub-system 20 or a network 30. Such applications will have the conventional program structure shown in Table I. Accordingly, the magic number provided in the program header of such application programs will be the conventional magic number as supplied with the application program. Consequently, the operating system program loader will recognize and treat such non-stripped code segment application programs as requiring image copies of both code and data segments to be transferred from the RAM disk 84 into otherwise unallocated portions of the transient program area 66. Thus, for example, application programs one and two, containing only a program header and data segment are stored on the ROM disk 76. Corresponding code segments are stored in the stripped code segments area 78. A third application program is stored either on the ROM disk 76 or RAM disk 84. This third application has a non-stripped program structure including a program header, code segment and data segment. The program headers of applications one and two are modified to reflect the fact that their corresponding code segments have been stripped. Consequently, on launch of each of the three application programs, an image copy of the data segments of applications one and two 86, 88 are placed in the transient program space 66, while an image copy of both code and data segments 90, 92 must be copied to the transient program space 66. Consequently, the code segment 90 of application program three requires duplicative code segment storage within the address space portion 60. Further, depending on the size and fragmentation of the transient program space 66 a substantial delay may be incurred in transferring the code segment of the third application program into the transient program space 66.

Figure 5:
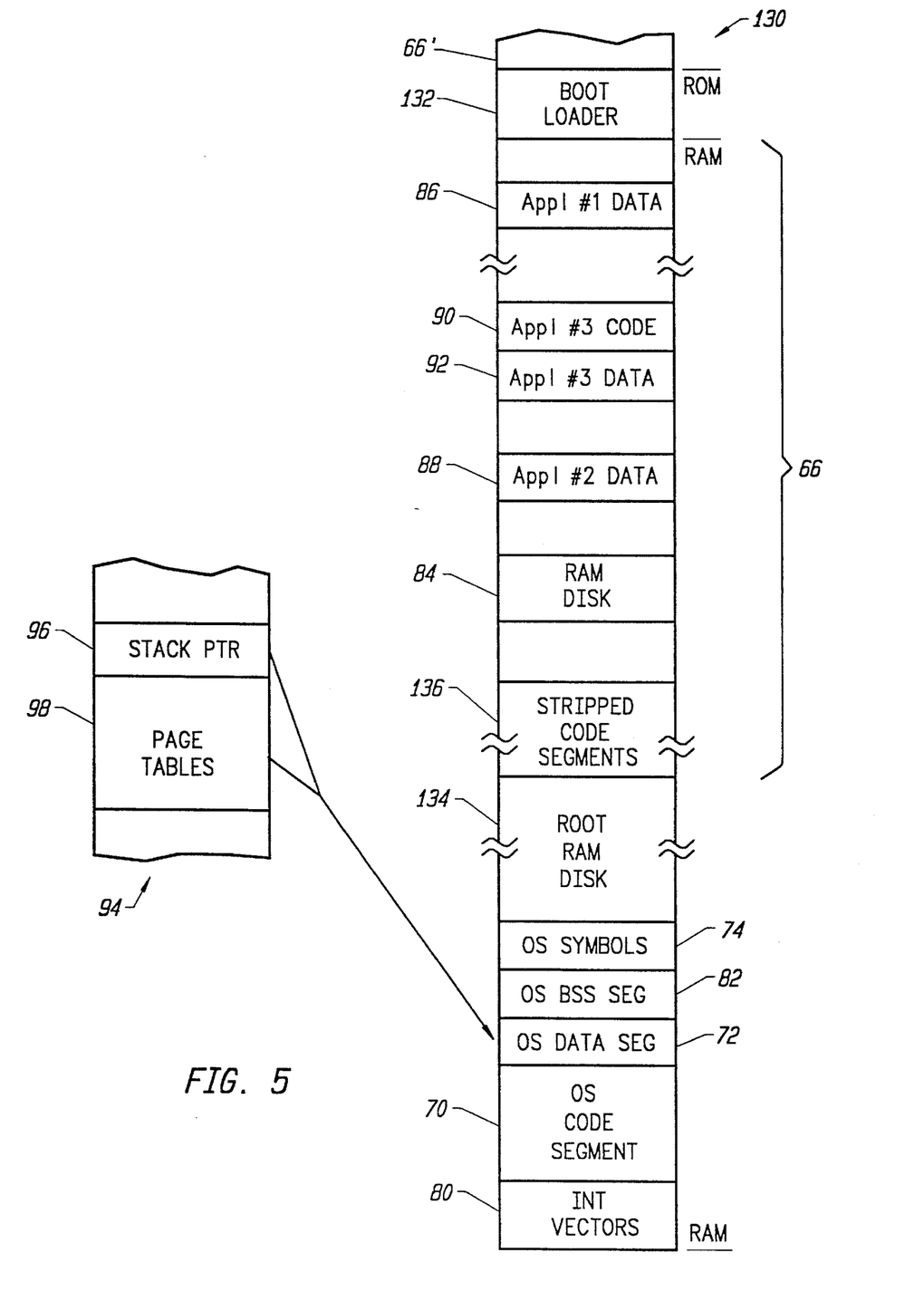
FIG. 5 is an alternate memory space map as implemented in another preferred embodiment of the present invention.

Another representation of a virtual address space portion 130 of the main memory 14, configured in accordance with an alternate preferred embodiment of the present invention, is shown in FIG. 5. Significantly, this virtual address space portion 130 is populated only with a small nonvolatile memory portion 132, containing an operating system boot loader program. The remainder of the address space portion 130 is implemented through the use of RAM memory. In this configuration, the present invention is best suited for use as a communication node or diskless workstation. A maximum amount of the virtual address space is implemented as RAM, allowing the greatest degree of flexibility in the operation of the computer system 10. Further, revisions and reconfigurations of the operating system may be readily performed remotely and transferred in response to the function of the operating system boot loader 132. In accordance with this embodiment of the present invention, the initial loading of the operating system and associated set of application programs is expedited through the image preparation of the download files.

The operating system boot loader program 132 is again preferably located at the default execution address known to the CPU 12. In this embodiment, the boot loader program 132 incorporates sufficient operational capability to direct at least basic network communications operations through the network interface 26 to request and receive a succession of data packets providing an image copy of the interrupt vector table 80, OS ".code", ".data", and ".bss" segments 70, 72, 82, the OS symbol table 74, root RAM disk 134, and stripped code segments area 136. This image is loaded, preferably, beginning at low physical memory. Once loaded into memory, the use and operation of this alternate embodiment of the invention, as represented by the virtual address space portion 130, differs from that of the address space portion 60 only in the terminal operation of the boot loader program. That is, since the initial image of the OS data segment 72 and OS symbols 74 are already present in RAM, a further image copy is not required. Although the page tables 98 provided for in the OS data segment 72 could be pre-initialized with respect to the allocation of, for example, a secondary RAM disk 84 in the transient program area 66, this preferred embodiment of the invention does not so provide. Rather, a common operating system external initialization procedure is utilized by the boot loader program 68, 132 prior to initiating the execution of the operating system code segments 70. Creation and configuration of the secondary RAM disks 84 is performed by the internal initialization operations of the operating systems 70. Consequently, the changes and distinctions between embodiments of the present invention necessary to realize operation in the forms represented by the virtual address space portions 60, 130 are minimized.

The process of preparing and using the preferred embodiments of the present invention will now be described particularly with reference to the preferred operating system embodiment, which is consistent with the architecture of the Unix operating system.

The first step in preparing an operating system and related data and program image is to prepare an image of the operating system kernel itself. This image requires inclusion of a pseudo-disk device driver. Any other desired device drivers must be included at this time. The operating system kernel must be configured at this time with respect to the allocation and identification of system resources to be used by the kernel. If this operating system kernel is to be downloaded to a computer system 10, then the uninitialized portion of the data segment, specifically the ".bss" segment, is preferably deleted from the kernel image. Finally, a "node_table" data table is constructed to identify the logical devices known to the kernel image, including their major and minor device numbers, whether the devices are logical block or character devices, and the device permissions.

The second step is to prepare a root file system image that logically corresponds to the intended operating system root file system. This can be easily accomplished by creating a directory structure, typically from a temporary root node, that matches the intended root file system directory structure. All of the supporting operating system data files and application programs are then copied into their proper locations within this directory structure. All data tables must be edited at this point to match the intended operating environment and resources of the operating system environment, particularly where the image is to be placed in ROM. Finally, the "node_table" data is used at this point to create the logical device files ("/dev/ . . . ") that are to be used by the operating system.

The third step is to prepare a stripped code segments file. All of the application programs present in the image root file system that are to have their code segments stripped are identified. Each identified application program is processed to copy the code segment to the stripped code segments file aligned on a memory page boundary. The corresponding program header is then updated to change the magic number to the IMagic value and to insert the eventual physical address of the code segment into the physical address field of the header. Since the size of the executable operating system image and related data structures, including the root file system and any prior stripped code segments is known, the eventual physical address of this code segment can now be calculated. Finally, the structure of the application program as stored in the root file system is modified to exclude the code segment by concatenating the program header with the program data segment.

A final fourth step is to prepare a single file containing the complete set of images necessary to construct the operating system. An initial 512 byte block is preferably placed into this destination file. An image of the operating system, as configured, and including the program data and OS symbols segments are placed in the destination file. An image of the root file system is then appended. The stripped code segments area image is then appended to the destination file. Finally, the first 512 byte block is updated to have an image copy of the program header appearing at the beginning of the operating system image. That is, the operating system is itself an executable program and is therefore conventionally created with a standard program header. In copying this program header to the beginning of the first 512 byte block, the magic number is changed to the IMagic value. A kernel information structure is then copied into the first 512 byte block immediately following the program header. Table III provides a C language definition of the preferred kernel information structure.

TABLE III

Kernel Information Structure

```
struct rkinfo {
    unsigned long rk_magic;      /* ROMable kernel magic
                                    number */
    unsigned long rk_osend;      /* End of ROMable kernel
                                    file */
    unsigned long rk_ramdisk;    /* Beginning address of
                                    ram/rom disk */
    unsigned long rk_entry;      /* Alt. entry point */
    unsigned int rk_rootdev;     /* Root device */
    unsigned int rk_reboot;      /* Reboot status */
    unsigned int rk_flags;       /* Misc. flags */
    unsigned long k_base;        /* Base memory size */
}
```

The elements of the kernel information structure are defined as follows:

| | |
|---|---|
| rk_magic: | this is the ROMable kernel magic number This must be IMagic. |
| rk_osend: | end of operating system. Includes the operating system and OS data, RAM/ROM disk image and stripped code segments area, if any. This is the first address that is available to the operating system for its own use and for user applications. Determined upon construction of the full operating system image. |
| rk_ramdisk: | starting address of "root" RAM/ROM disk. This is always at a fixed address that is determined by kernel size. |
| rk_entry: | Operating system execution entry point. |
| rk_rootdev: | Logical device id of the "root" RAM/ROM disk. This is determined from "node_table" entry for /dev/rd0 during construction of the full operating system image. |
| rk_reboot: | This allows passing of reboot flags to the operating system. |
| rk_flags: | Flags used by kernel. One flag specifies whether the main memory of a diskless node is fragmented. Another flag specifies that the OS boot loader is to automatically expand the ".bss" segment on operating system load. |
| rk_base: | Size of base memory if main memory is fragmented. For example, 640K of memory on Intel i386 CPU based machines. |

The values of the kernel information structure are all calculable prior to the writing of the structure into the first 512 byte block. Thus, the operating system image destination file so constructed is complete and ready for use.

While the first two steps are substantially manually executed steps, the third and fourth steps are readily performed by a utility program in the preferred embodiment.

Figure 6:
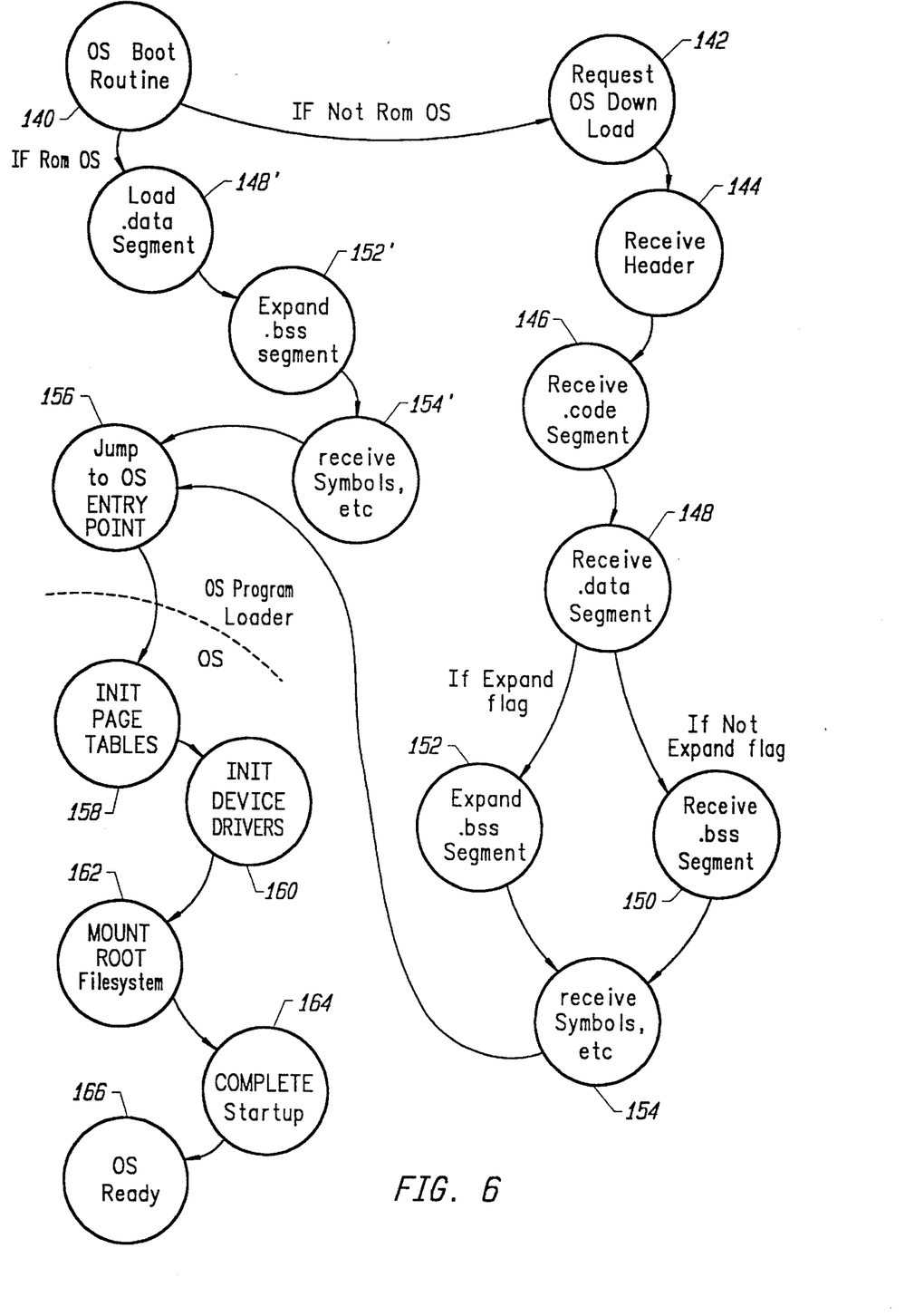
FIG. 6 is a control flow diagram illustrating the operating system boot load procedure as implemented in a preferred embodiment of the present invention.

A control state flow diagram is provided FIG. 6 to illustrate the loading of an operating system image file for execution. A pseudo-code representation of this process is given in Table IV.

TABLE IV

OS Boot Load Procedure

```
If not a ROM OS then
    OS boot loader requests and receives blocks
        from default communications port
    Receive .code segment
    Receive .data segment
    If rk_flags = expand .bss then
        allocate .bss segment space
        clear .bss segment to 0
    Else
        Receive .bss segment
    Receive OS Symbols, etc.
Else
    Load .data segment to RAM
    Allocate .bss segment space in RAM
    Clear .bss segment to 0
    Load OS Symbols, etc. to RAM
End_if
OS boot loader jumps to OS entry point (rk_entry)
    with pointer to rk_info structure
OS executes internal start-up procedures
    page tables initialized; stripped code
        segments area not included as allocable
        memory
    pseudo-disk device driver initialization
        routine is executed to establish root
        pseudo-disk drive; initial address of
        pseudo-disk drive is specified by
        rk_info.rk_ramdisk
    other device driver initialization routines
        are executed
    root device is mounted using the logical
        device specified by rk_info.rk_rootdev;
        corresponds to the root pseudo-disk
        drive
    start/initialize other system services
        including secondary RAM disk
    start-up procedures complete
OS ready
```

Referring to FIG. 6 specifically, a control state 140 exists within the operating system boot loader to determine whether the operating system kernel image is present in ROM already or needs to be downloaded. If the operating system kernel image is to be downloaded, a transition is made to control state 142 wherein a request to receive an operating system download image is passed to a remote file server via the network interface 26. The first download block is received in control state 144. This first block includes the first 512 byte block of the operating system kernel image file. This block, and those that follow, are generally placed in the main memory 14 at a predefined location known to the operating system boot loader, though generally beginning at an address above the interrupt vector table. The data blocks consisting of the operating system kernel ".code" segment are received in control state 146. The ".data" segment is received and placed in main memory in control state 148. If the uninitialized data segment expand flag in rk_flags, as determined from the kernel initialization structure received in control state 144, was not set, the full ".bss" segment is received in control state 150.

If, however, the expand flag was set, a control state 152 is entered instead. Here, the OS boot loader directly allocates the required size of the ".bss" segment without requiring the segment to be actually downloaded. The ".bss" segment section header, received as part of the program header in control state 144, defines the desired size of the ".bss" segment. As this segment may be 80 to 100 kilobytes in length, depending on the configuration of the operating system kernel, a significant amount of time may be saved by expanding the ".bss" segment locally rather than requiring the segment to be downloaded. The ".bss" segment is then cleared.

Control states 150, 152 both transition to a control state 154 to receive the operating system symbols segment for placement into main memory.

Where the operating system is present in ROM, a transition is made from control state 140 to a control state 148' where the ".data" segment is loaded from ROM into main memory. A transition is then made to a control state 152'. In this state, the OS boot loader directly allocates the required size of the ".bss". The size of the ".bss" segment is determined from the operating system program header stored at the beginning of the ROM stored image of the operating system code segment. Again, since the ".bss" segment may be 80 to 100 kilobytes in length, depending on the configuration of the operating system kernel, a significant amount of ROM storage is saved by expanding the ".bss" segment by the function of the OS boot loader, rather than requiring an image to be stored in ROM. The RAM ".bss" segment is then cleared. Control state 152' transitions to a control state 154' to receive the operating system symbols segment for placement into main memory.

State transitions from the control states 154 and 154' are made to the final OS program loader state 156. This final state prepares a pointer value to the kernel information structure and, from that structure, determines the entry point to the operating system kernel image for execution. A control state transition, transferring the kernel information structure pointer, is then made to the operating system kernel. A generalized control state 158 represents the initial initialization operations performed by the operating system kernel. These operations would include, for example, establishing the virtual memory management page tables and the kernel stack pointer. A transition is then made to a control state 160 that provides for the initialization of the kernel device drivers. The root file system is established with respect to the operating system kernel in this control state. On transition to a control state 162, the established root file system is mounted for standard access by the operating system kernel. A control state 164 generically represents the performance of all remaining operating system kernel internal initialization processes ending with a transition to a "ready" control state 166. The operating system is now ready for general use.

Figure 7:
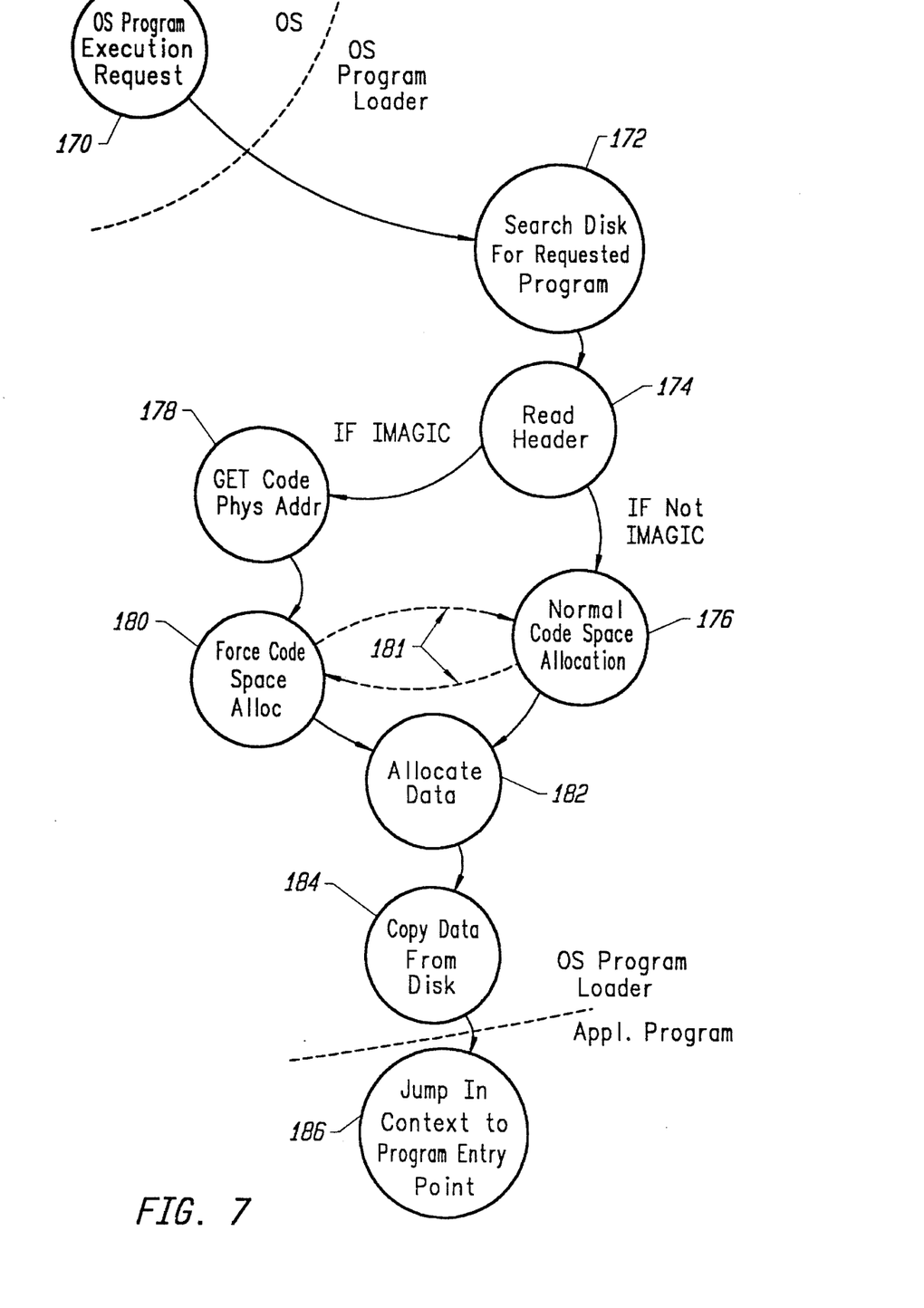
FIG. 7 is a control flow diagram of the operating system application program load procedure as implemented in a preferred embodiment of the present invention.

FIG. 7 provides a control state transition diagram that illustrates the preferred modified operating system program load procedure of the present invention. A pseudo-code representation of this process is given in Table V.

TABLE V

OC Application Program Load Procedure

Call program loader with parameter indentifying
    application program to execute
Program loader finds and reads header on program
If magic number = IMagic then
    case: a.out format then
        extra four bytes appended to program
        header form pointer to the TABLE V-continued OC Application Program Load Procedure         stripped code segment
    case: COFF format then
        get physical address from pre-defined
            header field
    end_case
    force allocation of memory for text segment
        to be at physical address for length
        specified for code segment section
        header; includes code segment within
        the virtual execution space of the
        program to prevent memory protection
        faults
Else
    allocate memory for code segment in the
        transient program space for length
        specified for code segment section
        header
    copy text segment from storage to allocated
        space
End_if
Allocate memory for data segment (.data and .bss
    per sizes specified in section headers)
Copy initial data from storage to allocated .data
    segment
Jump to code segment entry point The operating system may receive requests to execute application programs from any number of different sources. These requests are processed to a control state 170 where the operating system program loader routine is called with an identification of the application program to be loaded and executed. In a control state 172, the operating system program loader, further operating through the pseudo-disk device driver, locates the requested program. The program header is read in a control state 174. Where the magic number is not set to the value of IMagic, a transition is made to a control state 176 that provides for the normal allocation of the process address space necessary for the execution of the requested application program. The program header, as obtained through control state 174, defines the amount of virtual address space required. In this control state, a call is made to a "get memory" kernel routine that operates to first allocate, then map the allocated memory into the virtual address space of the process. Table VI describes the preferred "get memory" kernel routine function call.

TABLE VI

Get Memory Kernel Routine

| Synopsis: | Obtain a fully qualified block of memory for use by a process. |
|---|---|
| Output: | OK or SYSERR |
| Syntax: | | getmem(mblock, base, size, job, flags)
| | struct memblock *mblock; | /* pointer to memory block structure */ |
|---|---|---|
| | char *base; | /* virtual memory address */ |
| | long size; | /* byte size of memory requested */ |
| | int job; | /* job requesting memory */ |
| | int flags; | /* access flags to be set */ |

The algorithm performed by the get memory kernel routine is as follows:

1. Calculate number of requested memory pages from "size" number of bytes. Dependant on the size of a memory page.
2. Get requested number of memory pages from memory free block list and attach to "mblock" memory block structure. Return SYSERR if all requested memory pages are not available.

3. Initialize pages attached to the "mblock" memory block structure.

4. Map these pages to the "job" process area by calling a kernel memory map routine (mem_map()). If there is any error in mapping, return SYSERR after releasing the memory pages acquired in step 2. Otherwise return OK.

The mapping of the allocated memory into the virtual address space of the process is performed specifically to establish the virtual memory protection mechanisms with respect to accesses within the allocated memory space by the execution of the application program. The preferred map memory kernel routine function call is described in Table VII.

TABLE VII

Map Memory Kernel Routine

| Synopsis: | Map a block of memory in to the protected address space of a given process address space. |
|---|---|
| Output: | OK or SYSERR |
| Syntax: | |
| mem_map (reblock, job) | |
| struct memblock *mblock; | /* memory block ptr */ |
| int job; | /* requesting job */ |

The "base" field of "mblock" memory block specifies the base or start of virtual address where memory is to be mapped to actual pages that are specified by the "plist" field, which is a list of actual pages. The preferred memory block structures are described in Table VIII.

TABLE VIII

Memory Block Structure

| struct memblock { | /* memory block structure */ |
|---|---|
| long base; | /* start address (virtual) of memory */ |
| int count; | /* number of pages of memory */ |
| int flags; | /* access flags */ |
| struct plist list; | /* actual page list */ |
| }; | |
| struct plist { | /* page list */ |
| int head; | /* head (pointer to first page) of page list */ |
| int tail; | /* tail (pointer to last page) of page list */ |
| }; | |

To accomplish the mapping, a correspondence is set up between the virtual addressed pages referenced by application programs, executing in their own virtual address spaces, and the physical memory pages that actually contain the required code or data. This mapping is generally machine dependent. However, the conventional function of the virtual memory management unit (MMU) is to take a virtual address and use it as an index to the page tables to find the corresponding physical address. The actual physical memory need not be contiguous.

Thus, in control state 174, where the magic number of the program header is determined to match the value of IMagic, a transition is made to control state 178. The program header is examined in control state 178 to obtain the physical address of the code segment associated with the requested application program. transition is then made to control state 180 for the allocation of memory for the code segment. However, as this code segment is already present in memory as part of the stripped code segments area and is already properly initialized by definition, a modified call, represented by the dashed transition lines 181, is made directly to the memory mapping kernel routine. That is, in calling the "mem_map()" function, the physical address of the stripped code segment is provided as the value of "mblock.base". An additional flag bit "Phys" is provided, or set, as part of the "mblock.flags" value to indicate that free space in the transient program area 66 memory need not be allocated in response to this call. Rather, the function of the memory map kernel routine is modified by the presence of the "Phys" bit to force mapping of a contiguous "mblock.count" number of pages of memory beginning at "mblock.base" into the context specific virtual address space of "job". In this manner, the stripped code segments area 78 is effectively included, as needed, in the transient program space of the address space portions 60, 130. Consequently, execution, indeed multiple executions, of this code segment are permitted fully consistent with the conventional memory protection function of the operating system kernel.

Both control states 176, 180 transition to a control state 182 that provides for the allocation of memory to accommodate the program data segment, including the ".data", ".bss" and symbol table segments. Since the program data segment must be provided in the transient program area of main memory regardless of whether the corresponding application program is stripped of its code segment or not, the segment must be place in alterable memory. Therefore, in the control state 182, the get memory kernel routine is again called to allocate, initialize and map the required size of memory into the virtual address space of the process. On transition to a control state 184, the ".data" and symbols segments are copied from storage into a corresponding portion of the allocated data segment.

A final control state transition is then made to control state 186 to initiate the execution of the application program within the processes virtual address space. This transition, though shown as a simple transition between control states 184, 186, is complex in that it must provide for the inclusion of the process in the execution scheduler of the operating system kernel as appropriate to schedule execution of the requested application program. However, in accordance with the preferred embodiments of the present invention, this control state transition is unaltered with respect to the conventional implementation of this function.

Thus, a disk operating system and computer architecture, providing for program code segments to be reserved within the file system name space, has been described.

Naturally, many modifications and variations of the present invention are possible in light of the above teachings. It is therefore to be understood that, within the scope of the appended claims, the invention may be practiced otherwise than is specifically described herein.

We claim:

1. A computer architecture comprising:

a) a main memory providing for storage of programs and data accessible by address reference within a predefined memory space;

b) a processor capable of accessing said predefined memory space by address reference; and c) a first program for controlling the operation of said processor upon execution by said processor, said execution of said first program providing for the reservation of a first portion of said predefined memory space for static storage of a second program, a second portion of said predefined memory space for execution of said second program by said processor, and a third portion of said predefined memory space, located within said second portion, for static storage of an executable code segment of said second program at a predefined address, said second program including an address reference to said executable code segment, said execution of said first program providing for said execution of said second program by execution of said executable code segment at said predefined address by said processor.

2. The computer architecture of claim 1 wherein said second program includes a program header and a data segment, wherein said first program includes a program loader, wherein said program loader provides for the transfer of an image of said data segment from said first portion of said memory space to a predetermined address within said second portion exclusive of said third portion, and wherein said program loader provides for initiating the execution of said second program at said predefined address with respect to said image of said data segment at said predetermined address.

3. The computer architecture of claim 1 or 2 wherein said main memory includes alterable and inalterable memory and wherein said first and third portions of said memory space are provided in inalterable memory and said second portion of said memory space is provided in alterable memory.

4. The computer architecture of claim 3 wherein said second program includes a control code segment provided at a first preselected address and a control data segment provided at a second preselected address, said computer architecture further comprising a boot program provided at a predetermined boot address within said memory space, said processor including means for initially executing said boot program, said boot program, upon execution, providing for the transfer of an image of said control data segment to a third preselected address within said second portion of said memory space exclusive of said third portion, and wherein said boot program provides for initiating the execution of said control code segment at said first preselected address with respect to said image of said control data segment at said third preselected address.

5. A computer architecture providing for the execution of programs within the main memory space of a computer system without requiring a local secondary storage device, where the programs are compiled to be loaded from a secondary storage device into main memory prior to execution, said computer architecture comprising:

a) a main memory providing for the storage of an operating system including at least a program loader, and an application program including at least a header, a code segment and a data segment in a first memory portion designated read only, said main memory including a second memory portion designated as readable and writable; and b) a processor coupled to said main memory for executing said operating system and said application program, wherein execution of said program loader provides for the reading of said header to obtain a pointer address to said code segment, writing an instance of said data segment in said second memory portion, and executing said code segment beginning at said pointer address with respect to said instance of said data segment.

6. The computer architecture of claim 5 wherein said first portion of said main memory is initially written with said operating system and application program and wherein said processor, in execution of said operating system and said application exclusively writes to said second portion of said main memory.

7. The computer architecture of claim 6 wherein said first portion of said main memory is comprised of a non-volatile random access memory and wherein said second portion of said main memory is comprised of a volatile random access memory.

8. The computer architecture of claim 6 wherein said first and second portions of said main memory are volatile random access memory and wherein said first portion of said main memory is protected from being written during the execution of said operating system and said application program by said processor.

9. The computer architecture of claim 7 or 8 wherein said main memory further provides for the storage of a boot program in a third portion of said main memory, wherein said operating system includes an OS code segment and an OS data segment, and wherein execution of said boot program by said processor provided for the writing of an instance of said OS data segment to said second portion of said main memory and the execution of said OS code segment resident in said first portion of said main memory relative to said instance of said OS data segment in said second portion of said main memory.

10. The computer architecture of claim 9 wherein said first portion of said main memory stores a plurality of application programs organized as a pseudo-secondary storage file system and a separate table of a like plurality of stripped code segments instantiated in said first portion of said main memory, said pseudo-secondary storage file system including a like plurality of application program headers and data segments.

11. The computer architecture of claim 10 wherein each of said application program headers including a memory pointer to a respective one of said plurality of stripped code segments.

12. A computer architecture providing for the efficient storage and execution of applications in a main memory where the applications are compiled to be necessarily loaded to main memory from secondary storage prior to execution, said computer architecture comprising:

a) a main memory including a static data space and a dynamic data space, said static data space including an emulated secondary storage file system and an executable code segment table, said emulated secondary storage file system including an application header and data segment, said code segment table including an executable code segment image corresponding to said application header; and b) a processor coupled to said main memory to permit reading of said application header, data segment and executable code segment image, said processor providing for the in-place execution of said code segment image using a representation of said data segment provided in said dynamic data space, wherein said static data space is treated as read only by said processor and said dynamic data space is treated as readable and writable by said processor.

13. The computer architecture of claim 12 wherein said application header includes a memory pointer to said executable code segment image in said static data space.

14. The computer architecture of claim 13 wherein said representation of said data segment may be an expanded image of said data segment as stored in said emulated secondary storage file system.

15. The computer architecture of claim 14 wherein said static data space is provided using non-volatile random access memory and said dynamic data space is provided using volatile random access memory.

16. The computer architecture of claim 15 wherein said application header includes an expansion flag identifying whether said data segment should be expanded to form said representation of said data segment.

* * * * *

UNITED STATES PATENT AND TRADEMARK OFFICE
CERTIFICATE OF CORRECTION

PATENT NO. : 5,594,903
DATED : January 14, 1997
INVENTOR(S) : Bunnell, et al.

Page 1 of 2

It is certified that error appears in the above-indentified patent and that said Letters Patent is hereby corrected as shown below:

Col. 9, line 20: After "made as", insert -- to --;
Col. 17, line 60: Before "Application Program", delete "OC" and insert therefor -- OS --;
Col. 18, line 3: Before "Application Program", delete "OC" and insert therefor -- OS --;
Col. 18, line 12: After "includes", delete "code" and insert therefor -- .code --;
Col. 19, line 24: After "mem_map", delete "(reblock, job)" and insert therefor -- (mblock, job) --;
Col. 19, line 65: Before "transition", insert -- A --;
Claim 1, Col. 20, line 61: After "program", insert -- , provided in said main memory, --;
Claim 1, Col. 20, line 65: After "program", insert -- exclusive of an executable code segment --;
Claim 1, Col. 20, line 66: After "space", insert -- , exclusive of said first portion, --;
Claim 1, Col. 21, line 2: After "storage of", delete "an" and insert therefor -- said --;
Claim 1, Col. 21, line 6: After "providing for", delete "said" and insert therefor -- the --;
Claim 3, Col. 21, line 21: After "includes", delete "alterable and inalterable" and insert therefor -- volatile and non-volatile --;
Claim 3, Col. 21, line 23: After "provided in", delete "inalterable" and insert therefor -- non-volatile --;
Claim 3, Col. 21, line 24: After "provided in", delete "alterable" and insert therefor -- volatile --;
Claim 4, Col. 21, line 26: Delete "second" and insert therefor -- first --;
Claim 4, Col 21, line 28: After "address", insert -- within said predefined memory space --;

UNITED STATES PATENT AND TRADEMARK OFFICE
CERTIFICATE OF CORRECTION

PATENT NO.   :  5,594,903
DATED        :  January 14, 1997
INVENTOR(S)  :  Bunnell, et al.

It is certified that error appears in the above-indentified patent and that said Letters Patent is hereby corrected as shown below:

.aim 4, Col. 21, line 30:   After "within said", insert
- predefined --;
.aim 4, Col. 21, line 34:   Before "memory", insert
- predefined --.

Signed and Sealed this

Twenty-fifth Day of November, 1997

Attest:

BRUCE LEHMAN

Attesting Officer    Commissioner of Patents and Trademarks